(12) United States Patent
Meinherz et al.

(10) Patent No.: US 9,279,902 B2
(45) Date of Patent: Mar. 8, 2016

(54) OPTICAL MODULE AND OPTICAL UNIT FOR A LIGHT CURTAIN, AND FABRICATION METHOD

(71) Applicant: CEDES SAFETY & AUTOMATION AG, Landquart (CH)

(72) Inventors: Carl Meinherz, Malans (CH); Richard Casty, Chur (CH); Danilo Dorizzi, Chur (CH); Martin Hardegger, Sargans (CH); Manfred Norbert Stein, Domat/Ems (CH); Clau Lombriser, Trun (CH); Guido Baumgartner, Fürstentum Liechtenstein (CH)

(73) Assignee: Rockwell Automation Safety AG (CH)

( * ) Notice: Subject to any disclaimer, the term of this patent is extended or adjusted under 35 U.S.C. 154(b) by 186 days.

(21) Appl. No.: 13/875,828

(22) Filed: May 2, 2013

(65) Prior Publication Data
US 2013/0292554 A1 Nov. 7, 2013

(30) Foreign Application Priority Data
May 2, 2012 (EP) .................................. 12166434

(51) Int. Cl.
| *F21V 15/01* | (2006.01) |
| *F21V 21/14* | (2006.01) |
| *G01V 8/20* | (2006.01) |
| *G01V 8/14* | (2006.01) |
| *F21V 5/04* | (2006.01) |

(52) U.S. Cl.
CPC ... *G01V 8/20* (2013.01); *F21V 5/04* (2013.01); *F21V 15/01* (2013.01); *F21V 21/14* (2013.01); *G01V 8/14* (2013.01); *Y10T 29/49002* (2015.01)

(58) Field of Classification Search
CPC ................................. G08B 13/183; G01V 8/10
USPC ................................... 250/221; 340/555, 556
See application file for complete search history.

(56) References Cited

U.S. PATENT DOCUMENTS

| 5,198,661 A | 3/1993 | Anderson et al. |
| 7,566,953 B2 * | 7/2009 | Boulin et al. .................. 257/667 |

(Continued)

FOREIGN PATENT DOCUMENTS

| EP | 1180697 A1 | 2/2002 |
| EP | 2511737 A1 | 10/2012 |
| WO | 2008113411 A1 | 9/2008 |

OTHER PUBLICATIONS

Extended European Search Report dated May 21, 2013; European Application No. 12166434.6.

(Continued)

*Primary Examiner* — Renee D Chavez
(74) *Attorney, Agent, or Firm* — Boyle Fredrickson, S.C.

(57) ABSTRACT

An optical module for an optical unit associated with forming a light curtain for monitoring a protective or surveillance field. The optical module includes at least one radiation emitting and/or radiation receiving element for transmitting and/or receiving a radiation beam associated with forming a light curtain. The optical module includes a module body for mounting a radiation transmitter/receiver carrier that carries the at least one transmitting and/or receiving element associated with the radiation beam. The module body has at least one alignment element for aligning the optical module within a support element that forms an outer housing of the optical unit.

17 Claims, 14 Drawing Sheets

(56) References Cited

U.S. PATENT DOCUMENTS

2005/0199786 A1 9/2005 Yoshida et al.
2006/0055063 A1 3/2006 Boulin et al.
2006/0065818 A1 3/2006 Shimokawa et al.

OTHER PUBLICATIONS

Extended European Search Report dated Jul. 17, 2015; European Application No. 14193138.6—(9) pages.

* cited by examiner

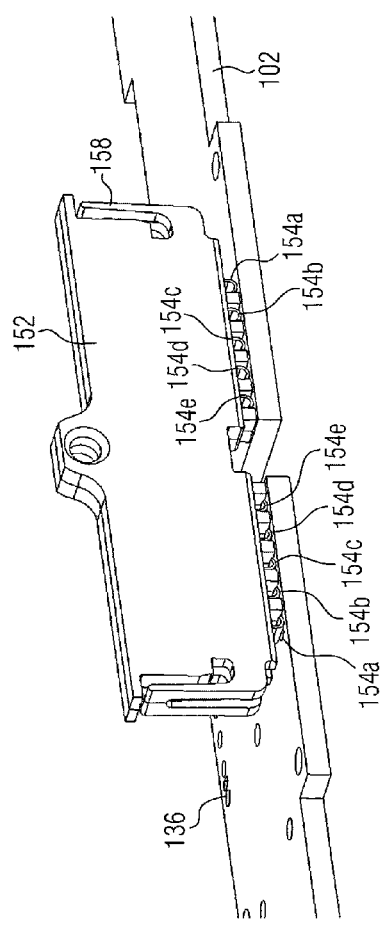
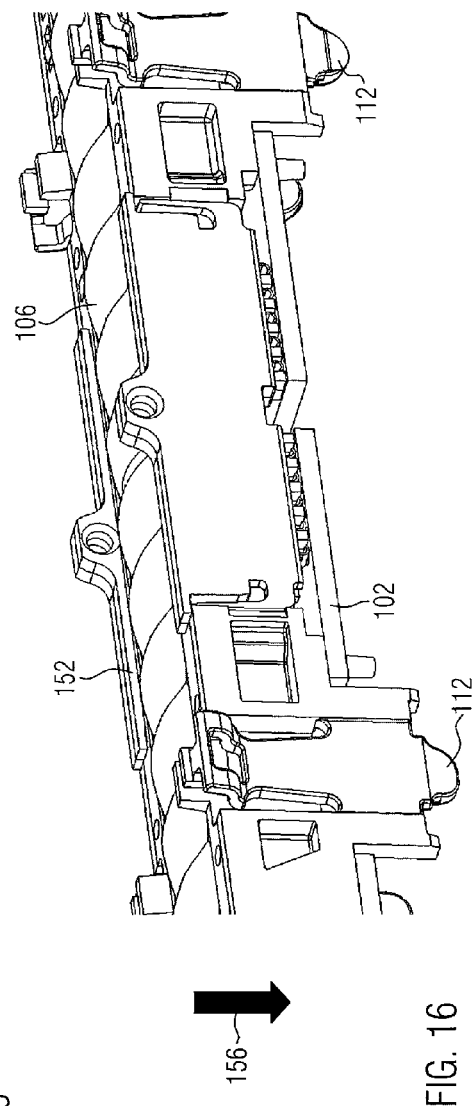

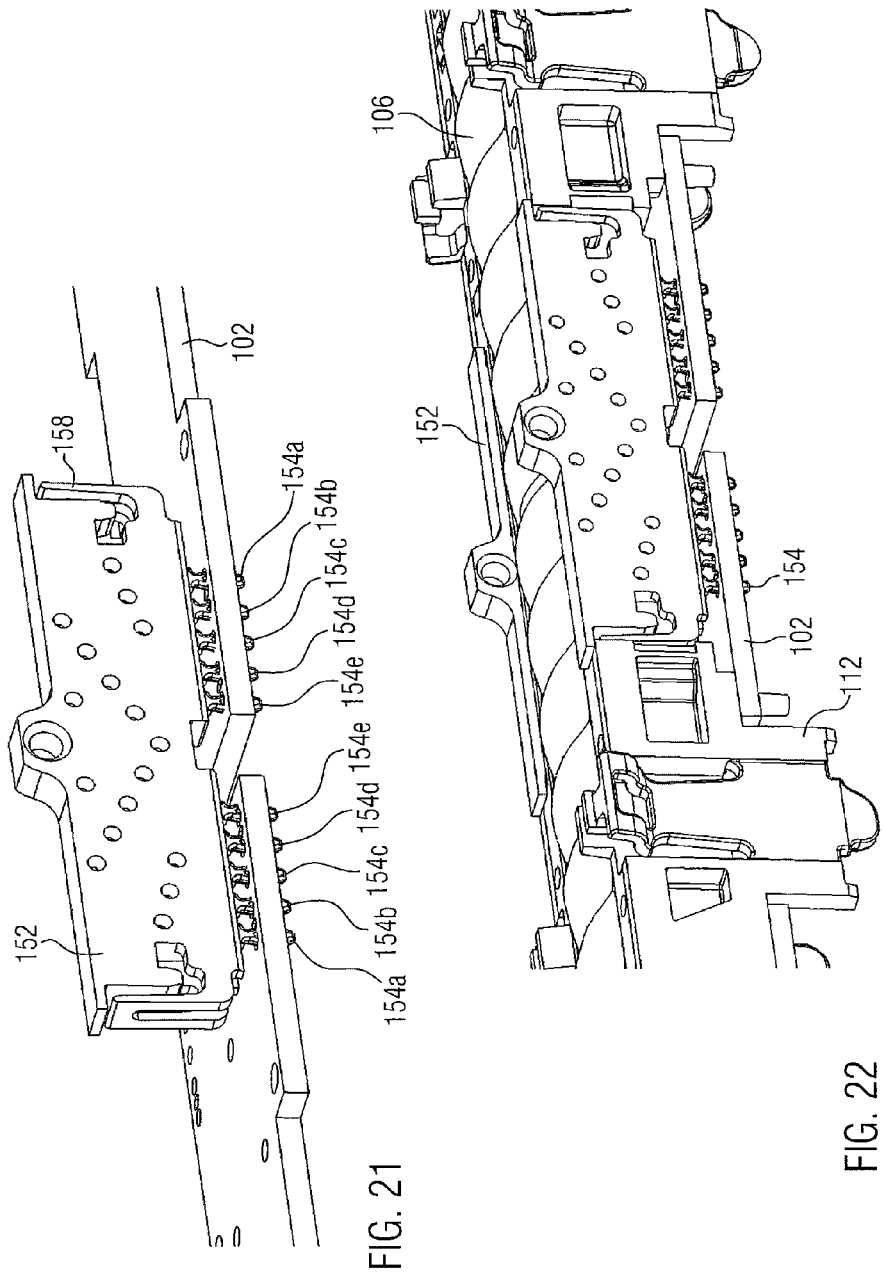

OPTICAL MODULE AND OPTICAL UNIT FOR A LIGHT CURTAIN, AND FABRICATION METHOD

CROSS REFERENCE TO RELATED APPLICATIONS

This application claims priority to European Patent Application No. EP12166434.6 filed on May 2, 2012 and titled "Optical Module And Optical Unit For A Light Curtain, And Fabrication Method" the disclosure of which is incorporated herein.

BACKGROUND

The present invention relates to industrial light curtains which monitor a protective or surveillance field and in particular relates to optical modules that can be used for such a light curtain. One or more of said optical modules and a control module may be combined to form an optical unit according to the present invention.

Light curtains which are formed by one or more radiation beams are usually also referred to as light grids or light barriers.

Some light curtains detect the movement or intrusion of objects into guarded zones and may provide protection for human operators who are working with machines or other industrial equipment. Other light curtain systems are designed to control and monitor industrial automation processes and are in particular used for verifying assembly processes, counting objects, confirming an ejection process, recognize leading edges of transported goods, recognizing irregular shapes and a lot of other applications.

Safety light curtains employing infrared or visible light beams are used to provide operator safety in a variety of industrial applications. In particular, the operator protection around machinery, such as punch presses, guillotines, molding machines, automatic assembly equipment, coil winding machinery, robot operation, casting operations and the like can be ensured by using light curtains. Conventional light curtains typically employ light emitting diodes (LED) mounted at spaced positions along a transmitter bar at one side of the guarded zone, and phototransistors (PT), photodiodes or other photo receivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, the control circuit shuts down the machine, prevents the machine from cycling, or otherwise safeguards the area.

As mentioned above, such an interruption of the beam can also be used for counting objects or verifying the entrance of goods through defined areas.

Usually, light curtains comprise two optical units, often called bars, sticks or strips, which are formed as to different constructional units, one of the optical units having the function of an emitter and one of a receiver. This dedicated architecture of an emitter and receiver, however, has several drawbacks, for instance the fact that the fabrication costs are high, because each type of optical unit has to be fabricated differently. Consequently, there exist concepts that use an architecture, wherein each optical unit has light emitting elements and light receiving elements at the same time. By providing the optical units with identical optical modules, which can operate as a receiver as well as a transmitter, and by additionally providing plug-in units, which differentiate the particular optical unit in its function as the emitter with, for instance, a test input, or as the receiver with, for instance, the output signal switching devices (OSSD), a particularly cost-effective way of fabricating optical units for a large scale production can be achieved.

Such a modular architecture is for instance proposed in the European patent application EP 11 162 263.5.

Optical modules, however, often suffer from the problem that the alignment of the optical axis for each of the radiation beams is difficult and that the fabrication of the whole module is expensive and involves a lot of rejections due to defects. This alignment is particularly difficult in respect to the various surfaces to where the assembled optical unit is mounted for the actual operation.

The problem underlying the present invention therefore is to provide an optical module, an optical unit and a fabrication method, whereby a particular cost-effective and reliable fabrication and adjustment of the optical components can be achieved.

SUMMARY OF THE INVENTION

The present invention provides an improved optical module for an optical unit which has alignment means for aligning the optical module within a support element forming an outer housing of the optical unit. In particular, the optical module according to the present invention has at least one radiation emitting and/or radiation receiving element for transmitting and/or receiving a radiation beam forming the light curtain. A module body is provided for mounting a radiation transmitter/receiver carrier and has at least one alignment element that allows aligning the optical module within the support element. By ensuring an accurate alignment of the module body within the support element, the position of the radiation beam regarding any surface whereto the support element is mounted can efficiently be controlled.

According to the present invention, this alignment element may comprise a protrusion extending in the direction along the optical axis of the radiation beam. The alignment protrusion interacts with an inner surface of the support element which extends across to the optical axis of the radiation beam. By choosing the reference for the mounting position in this way, a particularly exact alignment of the optical module within its housing can be achieved, leading to a minimal mounting tolerance between the optical axis of the radiation beam and the support element. According to the present invention, the support element may be formed by an essentially U-shaped aluminium profile. In this case, the surface of the profile which is most exact with respect to the outside bottom surface which, on the other hand, is used for mounting the light curtain e.g. on a machine, is the inner bottom of the aluminium profile. By choosing this particular plane as a reference for the alignment element, a reduced mounting tolerance can be achieved.

By directly fixing the module body within the support element, this aligned position can be maintained even under rough environmental conditions, such as temperature variations and vibrations. Such fixing means may, for instance, comprise resilient snap-in elements that cooperate with corresponding connectors provided at the support element. Such snap-fit connections, for instance, using resilient metal springs or snap-in hooks made from plastic, have the advantage in that they provide a secure fixing on the one hand, but allow for easy disassembly on the other hand. In particular, for optical units carrying a plurality of optical modules, it is advantageous that in case of failure of one optical modules, they can be replaced easily without the necessity of disposing of the whole optical unit.

A particularly efficient alignment of the radiation beam within the support element can be achieved when using an optical module having an integrated lens carrier which has at least one lens for focusing the radiation beam forming the light curtain.

This lens carrier may for instance be formed by overmolding a lens mask with a transparent material. In the case where a plurality of lenses is formed on the lens carrier, by means of such a simultaneous overmolding step, all the lenses can be fabricated and aligned with respect to each other in one tightly toleranced overmolding step.

Due to the fact that not a plurality of lenses with smaller geometrical dimensions has to be aligned individually, but a much larger array of lenses can be aligned simultaneously, the accuracy of the alignment is significantly improved.

When forming the lenses and a lens mask as one combined part, no separate alignment step has to be performed during assembly with respect to the position of the lens mask relative to the lenses. Thus, a very high precision can be reached for mounting the light curtain. In particular, the usable angle for the application is larger, and it is easier to align and set up the light curtain.

In particular, when fabricating the lens mask from a stamped metal sheet, improved thermal expansion characteristics of the lens carrier can be achieved. It could be shown that the thermal expansion of the composite lens carrier consisting of a metal lens mask overmolded with a plastic lens material is determined by the characteristic values of the metal sheet. These values, however, are compatible with the printed circuit board on the one hand and surrounding metal profile on the other hand. Thus, the robustness and reliability of the assembled optical module can be improved even for applications in a rough environment with considerable temperature differences.

There are several highly advanced techniques for fabricating lenses by molding techniques and a variety of different lens forms can be realized on the lens carrier according to the present invention, as this is known for a person skilled in the art. In particular, plano-convex or biconvex lenses can be formed on the lens carrier. However, also a Fresnel lens can be fabricated which has the advantage of being much thinner than the plano-convex or biconvex lenses.

The transparent material which forms the lenses may comprise polymethylmethacrylate (PMMA) or polycarbonate (PC). It is clear for a person skilled in the art, that all other transparent materials which have the required chemical and physical characteristics may of course also be used for fabricating such a lens carrier. An overview over suitable materials can for instance be found in De Schipper, R. et al: "Kunststoffoptik", Optik & Photonik, October 2006, Nr. 2, p. 47-49.

An optical module according to the present invention comprises an integrally formed lens carrier and a module body for mounting a radiation transmitter/receiver carrier comprising at least one transmitter and/or receiver for transmitting and/or receiving the radiation. In most cases the carrier will be formed by a printed circuit board (PCB). However, any other circuit carriers, e. g. Molded Interconnect Device (MID) carriers, can also be used. Such an MID carrier can firstly be fabricated together with the module body in the same molding step, and secondly provides the possibility of fabricating a three-dimensional circuit carrier structure. The module body itself could be an MID part where the electrically conductive leads and optoelectronic components are arranged directly on the module body. In this case, an additional circuit carrier for the optoelectronic components can be avoided. Furthermore, the module body and the lens carrier can be fabricated as one integral molded part. Thus, very low tolerances between the at least one lens and the module body can be achieved. This is particularly advantageous because the module body in most cases represents the geometric reference for aligning the optical module during assembly. Thus, the tolerances between the optical axis of the lens and any surfaces to which the optical module is mounted, can be kept low.

The optical module may furthermore be provided with an optical stop element comprising at least one cut-out for letting pass the radiation from/to the radiation transmitter and/or receiver. To this end, the optical stop element is preferably fabricated from an opaque material, for instance from a stamped metal sheet. For mounting the printed circuit board on the module body, same can advantageously be provided with mechanical fixing means, such as protrusions, snap-in hooks, snap-in notches, or the like.

In order to avoid that neighboring radiation paths are disturbed, the optical module according to the present invention has an optical shielding element, which can be inserted as a part separate from the module body and the lens carrier. As this part does not need any particularly accurate alignment, it can be fabricated as a cheap and simple part, which only has to fulfill the requirement of being formed from an opaque or non-transmissive material.

The optical module according to the present invention may be provided with separate radiation emitting and/or radiation receiving elements or with combined transceiver means. The radiation emitting element may be formed by a light-emitting diode (LED) and a light-receiving element may comprise of a photo diode. Furthermore, the chips carrying the LEDs and/or the photo diodes may be placed on the printed circuit board by means of conventional chip on board (COB) assembly technique.

When providing a plurality of optical modules within one support element, and for connecting one or more of them with a control module, interconnection means may be provided at each optical module. In particular, conductive pad-shaped terminals or plug connectors, as well as metalized interconnection means and/or terminals or connectors for a press-fit connection can be provided.

An optical unit of a light curtain monitoring a protective field according to the present invention comprises at least one optical module according to the present invention, and a support element which forms an outer housing of the optical unit. In particular, when forming the support element to have an essentially U-shaped cross section with a basis and two legs, at least one alignment element may interact with the inner surface of the basis so that the optical module is particularly efficiently aligned with respect to the outer surface of the basis. This is particularly advantageous, because the outer surface of the U-shaped profile, in many cases, forms the plane which is in contact with the machinery or the mounting means to which the radiation beam has to be aligned.

The present invention is based on the finding that when fabricating a support element as a U-shaped profile, the inner surface of the bases has a reduced tolerance regarding the outside surface of the same basis.

For forming an electrical connection between the optical module and a control module or to another identical module, separate interconnection elements may be provided according to the present invention. By providing the interconnection element as a separate part, the mounting procedure can be fully automated and is significantly facilitated. The electrical terminals of such an interconnection element can, for instance, be formed as resilient abutting spring contacts, plug-in contacts, or as press-fit contacts. A particularly stable construction and cost-effective fabrication may be achieved by forming the interconnection element from an overmolded lead frame.

A method for assembling an optical unit according to the present invention includes providing at least one optical module with at least one radiation emitting and/or radiation receiving element for transmitting and/or receiving a radiation beam forming a light curtain. A module body is mounted for receiving a radiation transmitter/receiver carrier and wherein the module body has at least one alignment element for aligning the optical module within a support element forming an outer housing of the optical unit. The support element is provided and the optical module is mounted within the support element.

According to the present invention, the optical module is inserted into the support element in the direction along an optical axis of the radiation beam. By such an insertion step, any shifting or sliding movements are avoided and therefore no damage at the optical modules is caused during mounting or replacing same in the support element. Each module can be directly mounted at its correct position, and the method therefore can easily be automated.

A particularly efficient way of fixing the optical module within the support element can be achieved by providing a snap-in fixing step during the mounting procedure. A predefined remaining pressure can be achieved for maintaining the relative position between the optical module and the surrounding support element.

Furthermore, according to the present invention, at least one interconnection element is provided for electrically connecting the optical module to either another, preferably identical optical module or a control module in the same direction as the insertion of the optical module into the support element. Consequently, the interconnection element can automatically be inserted and, furthermore, can easily be removed, if a replacement of the interconnection or the module body is necessary.

The method for fabricating an optical module according to the present invention further includes fabricating a lens carrier by overmolding a lens mask with a transparent material and providing a module body, which is fabricated by overmolding the lens carrier. Thus, both parts can be fabricated within the same tool so that a particularly accurate alignment and low tolerances can be achieved.

According to an advantageous embodiment, first the lens mask is inserted into the tool which is then overmolded to form the lens carrier. Without removing the lens carrier from the molding tool in a next step, an optical stop element may be positioned within the molding tool and the lens carrier and the stop element are then overmolded to form the integrated optical module. This is a particularly fast, time-saving and at the same time accurate fabrication method for an optical module according to the present invention.

Of course, the module body and the lens carrier can also be fabricated in separate molding steps and subsequently attached to each other.

The optical shielding element is only inserted after removing the module body with the lens carrier from the molding tool by sliding in the optical shielding element in a direction across to the optical axis of the at least one lens.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will become apparent from the following more particular description of the various embodiments of the invention, as illustrated in the accompanying drawings, in which like references refer to like elements, and wherein:

FIG. 15 shows an interconnection element according to a one embodiment;

FIG. 16 shows the connection between two optical modules by means of two interconnection elements according to FIG. 15;

FIG. 21 shows an interconnection element according to a further embodiment;

FIG. 22 shows the connection between two optical modules by means of two interconnection elements according to FIG. 21;

DETAILED DESCRIPTION OF THE PREFERRED EMBODIMENTS

Figure 1:
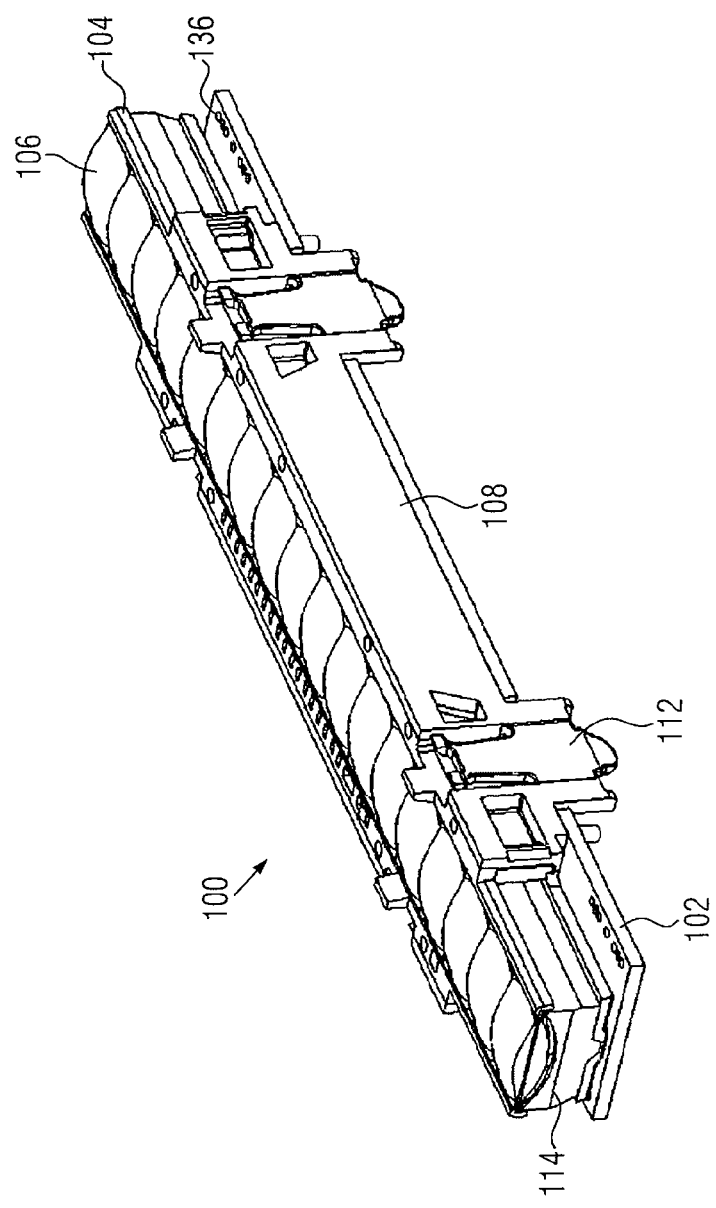
FIG. 1 shows a perspective view of an optical module.

The present invention will now be explained in more detail with reference to the figures. In particular, FIG. 1 shows in a perspective view an optical module 100 according to the present invention comprising a printed circuit board (PCB) 102 connected thereto. The optical module 100 with the PCB 102 is to be mounted in an outer housing, a so-called profile which is shown in FIG. 4 to FIG. 12.

As shown in FIG. 1, the optical unit 100 represents the functional unit for transmitting and/or receiving light which forms a light curtain for monitoring a desired surveillance area. A second, corresponding optical module with a printed circuit board is arranged opposing to the one shown in FIG. 1 for forming the light curtain. Alternatively, reflecting elements can also of course be used.

The PCB 102 carries the light-emitting and/or receiving elements and the required interconnection leads. If necessary, also integrated circuitry can be provided on one or both of the surfaces of the printed circuit board 102. The emitted radiation can in particular be visible light, in particular red light with a wavelength range of 620 nm to 750 nm. By using visible light, optical units containing optical modules according to the present invention can be aligned when mounting same in the surveillance area by visual control of a human operator. In contrast to light curtains where infrared light is used for the emitters, such an alignment can be performed without additional costs and furthermore, the eye protection requirements can be fulfilled much more easily. At the geometric position of each radiation beam the PCB 102 may carry an LED as a light emitting device or a photodiode as a light detecting element or may even carry combined transceiver element, as this is for instance proposed in the European patent application EP 11 162 263.5 "Modular light curtain and optical unit for a light curtain".

The optical module comprises a lens carrier 104, which combines a plurality of lenses 106 as one integral unit. A module body 108 serves for mounting the PCB 102 and furthermore carries an optical stop element having openings for letting pass the radiation between the PCB 102 and the lens 106. This will become more obvious when further looking at FIG. 2.

According to the present invention, mounting and alignment means 112 are provided for adjusting the position of the optical module with the PCB 102 in a profile as shown in FIGS. 4-12.

In particular, the alignment means 112 comprise at least one protrusion and as shown four protrusions which are in direct contact with an inner bottom surface of the profile into which the optical module 100 is mounted. A particularly accurate alignment between the optical axis of the lenses 106 and the outer profile of the completely mounted optical unit can be achieved by tight tolerances between the lens carrier 104 and the module body 108 on the one hand, and between the alignment elements 112 and the profile on the other hand. According to the present invention, the optical module 100 has contact terminals 136 which can be used for interconnecting the optical module 100 either to a similar or identical optical unit or to a control module (not shown in the figures). The particular embodiments of different interconnection elements will be explained in more detail later.

As all the lenses 106 of the optical module 100 are fabricated as one single part, there is no requirement of aligning same individually when assembling the optical module 100. Consequently, a very high accuracy regarding the distance and the parallelism of the radiation beams can be achieved. As this is generally known for light curtains, different resolution standards are defined according to the particular application field to be monitored. A light curtain normally has several beams that are placed closely together, whereas a light grid consists of only one, two, three or four light beams. The beams are closest on a light curtain that is used for finger detection, then the resolution is commonly 14 mm. Light curtain beams are at their widest spacing when used for leg detection (90 mm resolution). Accordingly, hand resolution is commonly defined at 30 mm. It is appreciated that other spacing configurations can be provided as a function of the intended detection activity.

For separating the individual beams from each other and for avoiding interference of scattered light, the optical module 100 further comprises a beam separating element 114. The beam separating element 114 is fabricated from an opaque plastic material and separates the space between the lens 106 and the LED or photodiode on the PCB 102 into individual chambers.

Figure 2:
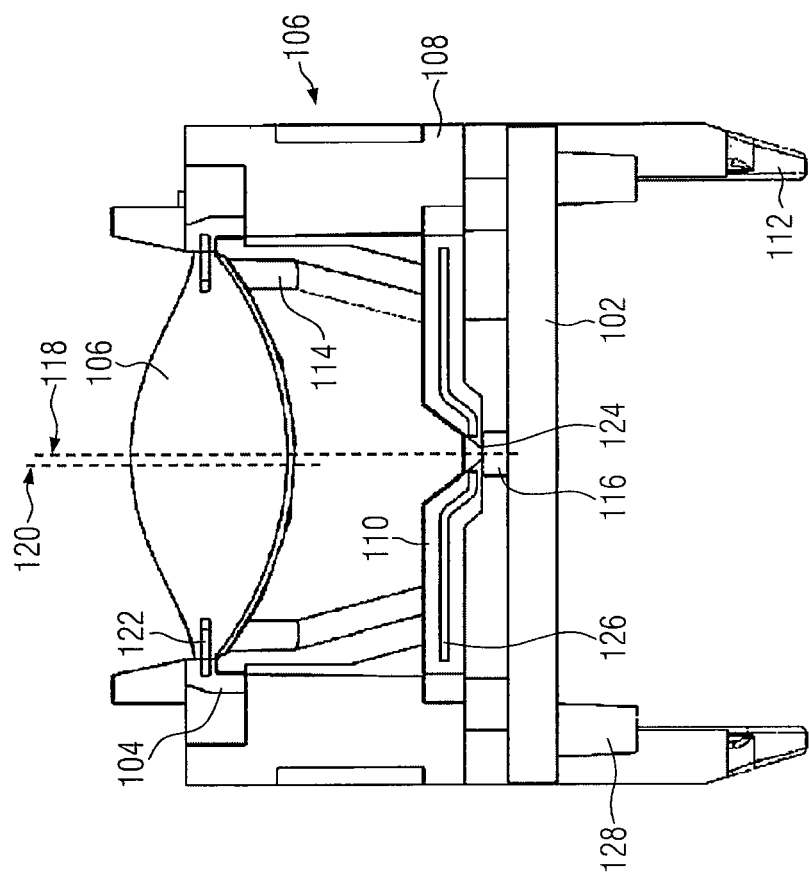
FIG. 2 shows a schematic sectional view of the arrangement of FIG. 1.

FIG. 2 shows a schematic sectional view of the arrangement of FIG. 1. On the PCB 102 a light receiving and/or a light emitting element 116 is mounted. This optical sender and/or receiver 116 defines a first optical axis 118. On the other hand, the center of the lens 106 defines a second optical axis 120. These two optical axes ideally coincide, but in any case have to be as close as possible to each other. According to the shown embodiment, the lens carrier 104 is formed by overmolding a lens mask 122 with a transparent plastic material. The transparent material may for instance comprise polymethylmethacrylate (PMMA) or polycarbonate (PC). The lens mask 122 has openings corresponding to the location of each lens 106, which are formed to shape the radiation emitted by a light-emitting element 116 into a particular beam shape corresponding to the required resolution of the light curtain.

Moreover, for shaping the transmitted light at the light source, an optical stop element 110 with a small opening 124 is provided. A preferably metallic stabilization element 126 is integrated within the optical stop element 124. The beam separating element 114 defines different chambers under each lens 106 for optically shielding the individual beams from each other.

For fabricating the optical module 100 according to the present invention, the lens mask 122 is fabricated from a stamped and bent metal sheet. The lens mask is aligned in a molding tool and overmolded with a transparent plastic material to form the lens carrier 104 with a plurality of lenses 106. In a next step, a metallic stabilization element 126 is aligned in the molding tool. In a subsequent second molding step the module body 108 is fabricated. The used material may for instance be Polybutyleneterephthalate (PBT).

By fabricating the module body as one integral molded part with the lens carrier very tight tolerances can be achieved because the mounting means which define the later mounted position of the PCB 102 are fabricated within the same tool as the lens 106. According to the embodiment shown in FIG. 2, a plurality of mounting projections 128 interact with corresponding openings in the PCB 102 for mounting same at the module body 108.

However, the module body 108 can also be formed as a separate component which is joined with the lens carrier 104 by any known mechanical means.

A further advantageous feature of the present invention is the fact that by integrating metal structures as the lens mask 122 and the stabilization element 126, the thermal expansion of the lens carrier 104 and the optical stop element 124 are much closer to the thermal expansion of the PCB 102 than a pure plastic material would be. Consequently, even under significantly differing temperature conditions, the alignment between the position of the light receiving and/or emitting elements 116, the openings of the optical stop element and the optical axes of the lenses 106 can always be maintained.

A further advantage of using an electrically conductive lens mask and, in particular, stabilization element 126 is the additional effect of an electromagnetic shielding towards the PCB 102.

Figure 4:
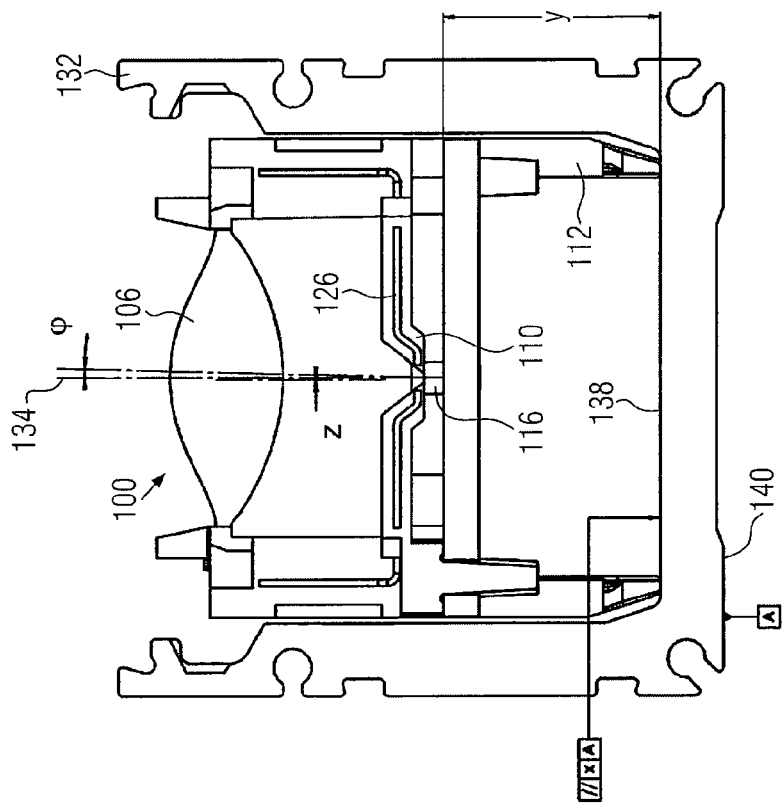
FIG. 4 shows a cross sectional view of the optical module according to FIG. 2 when mounted in a support element.

According to the present invention, the optical module 100 comprises protrusions 112 which define a position of the optical module within a support element that forms the outer housing of an optical unit with one or more optical modules 100 (see FIG. 4). The protrusions may internally be enforced by parts of the stabilization element 126.

Figure 3:
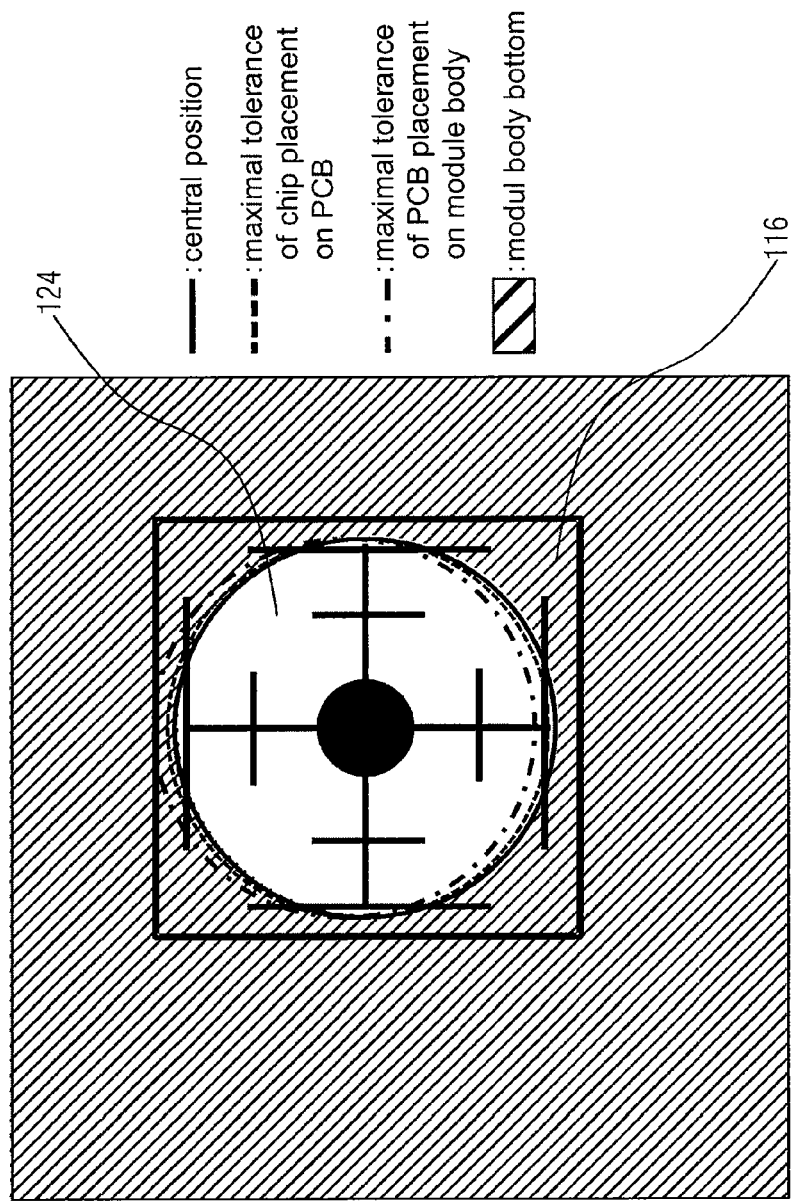
FIG. 3 shows a schematic representation of the various tolerances for an LED position.

By fabricating the optical module 100 according to the fabrication steps explained above, very tight tolerances can be reached for the position of the LED or photodiode with respect to the optical axis of the lens. FIG. 3 compares the tolerances of the chip placement on the PCB 102 and the tolerance of the PCB placement with respect to the module body 100. With a desired central position with regard to the openings 124 it can be shown that in any case the LED 116 is sufficiently centered with respect to the opening 124.

With reference to FIG. 4, the mounting of the optical unit 100 according to FIGS. 1 and 2 within a support element 132 is explained in more detail. As already mentioned, the optical module 100 has four alignment protrusions 112 which define a particular height y of the light receiving and/or emitting element 116 from the inner bottom surface of the support element. Furthermore, the inner plane 138 of the support element 132 defines an angle y which describes a deviation from an ideal central axis 134, this ideal axis being defined by an ideal parallelism of the inner plane 138 in respect to the outer contour 140. When forming the support element 132 as an aluminium profile with an essentially U-shaped cross section, it has been found that the parallelism between the inner surface 138 of the support element and the outer surface 140 of the support element can be controlled with extremely low tolerances. Furthermore, by fabricating the alignment elements 112 as an integral part of the module body 108, a high accuracy can also be achieved for defining the height y from the bottom surface 138. Finally, a shift of the optical axis of the lens 106 with respect to the optical stop element 110 is shown in the figure by deviation z. Resulting from these tolerances a total angular deviation φ can be defined compared to an ideal middle axis 134.

Figure 5:
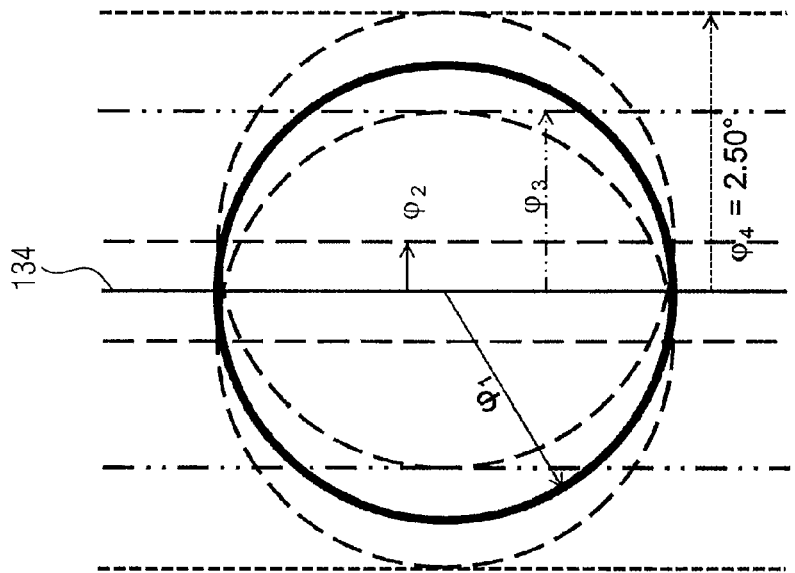
FIG. 5 shows the different tolerances for the angular deviation of the beam position referring to FIG. 4.

FIG. 5 summarizes the different angles which have to be considered for the arrangement according to FIG. 4. The beam position set value 134 represents the location of the ideal middle axis when looking onto the optical module from above. An angle deviation φ4 of 2.50 degrees is usually the maximum allowable deviation which must not be exceeded under all circumstances. The angle φ1 symbolizes the optical design angle, whereas φ2 designates the total tolerance as resulting from the tolerances explained with respect to FIG. 4.

Consequently, the usable optic angle is defined by φ3. Preferably, this usable angle is optimizing during implementation of the present invention.

Figure 6:
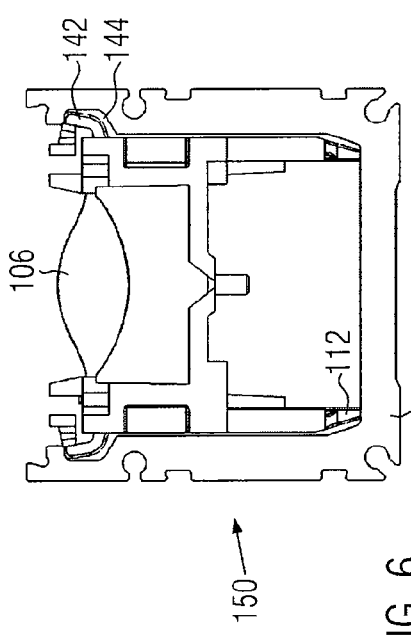
FIG. 6 shows a schematic cross section of an optical unit according to one embodiment.

According to a further advantageous embodiment, resilient fixing means 142 can be provided at the optical module 100 for retaining same within the support element 132. FIG. 6, for instance, shows a plastic spring element, which interacts with a recess 144 at the support element 132 for fixing the optical module 100 within the support element 132. Such a snap-fit or snap-in fit has the advantage of providing a sufficient pressure and holding the optical module tightly and firmly even under conditions where temperature changes and vibrations may occur. Alternatively, also other means of fixing the optical module 100 within the profile 132 can also be used, e. g. adhesive techniques, ultrasonic welding, screw connections and the like.

Figure 7:
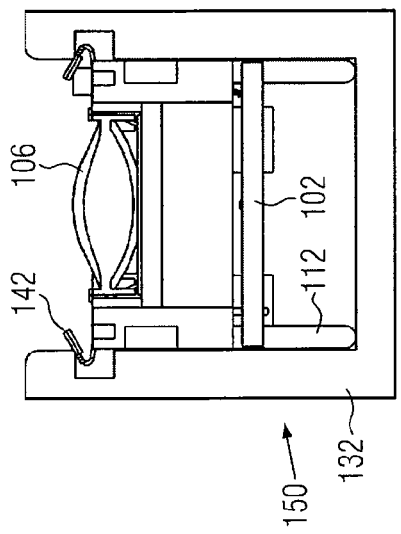
FIG. 7 shows a schematic cross section of an optical unit according to an another embodiment.
Figure 9:
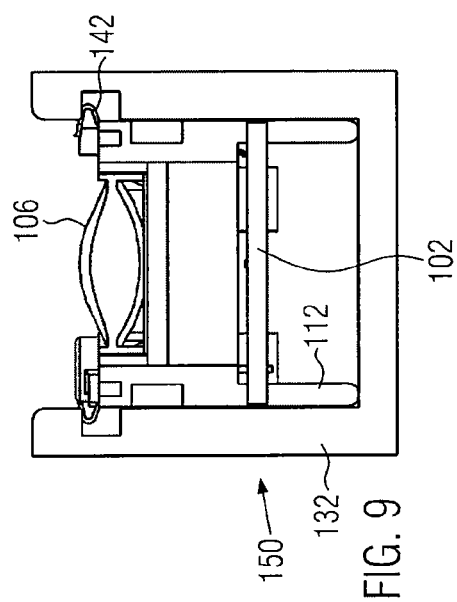
FIG. 9 shows a schematic cross section of an optical unit according to still a further embodiment.
Figure 8:
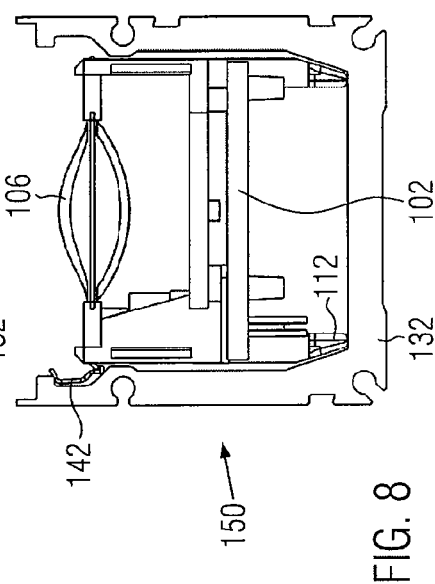
FIG. 8 shows a schematic cross section of an optical module according to a further embodiment.

Alternatively to the plastic snap-fit of FIG. 6, also metal springs 142 may be provided as shown for the optical units 150 of FIGS. 7 to 9.

Figure 11:
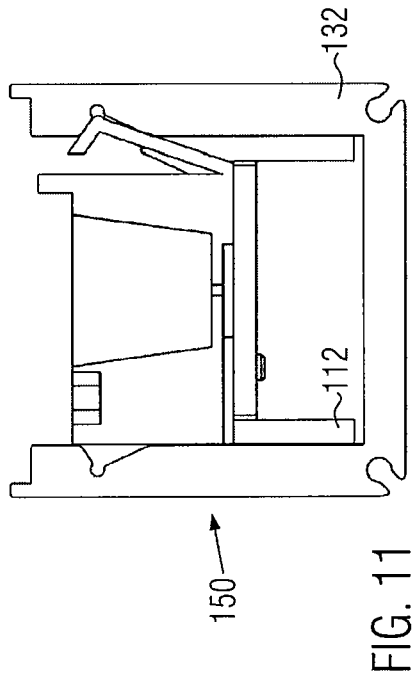
FIG. 11 shows a schematic cross section of an optical unit according to still a further embodiment.
Figure 10:
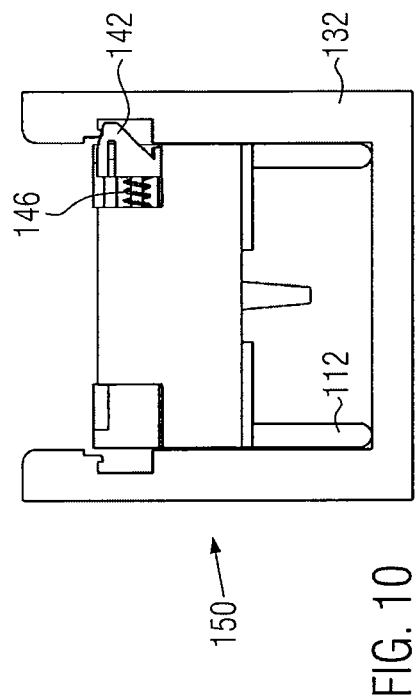
FIG. 10 shows a schematic cross section of an optical unit according to still a further embodiment.
Figure 12:
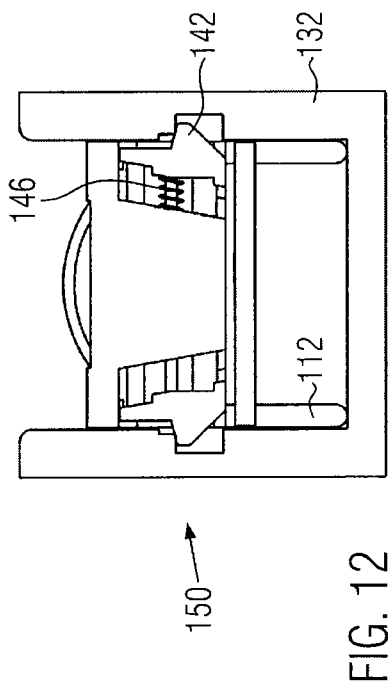
FIG. 12 shows a schematic cross section of an optical unit according to still a further embodiment.

FIGS. 10 and 12 illustrate an arrangement where coil springs 146 are arranged within the optical module 100 for providing the necessary resiliency for the movable fixing means 142. FIG. 11 shows a more simplified arrangement having a snap-in hook for retaining the optical module 100 within the support element 132.

Figure 13:
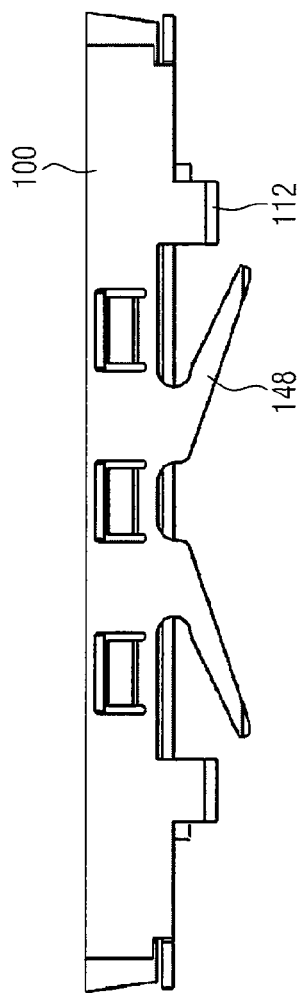
FIG. 13 shows a side view of an optical module according to a further embodiment.
Figure 14:
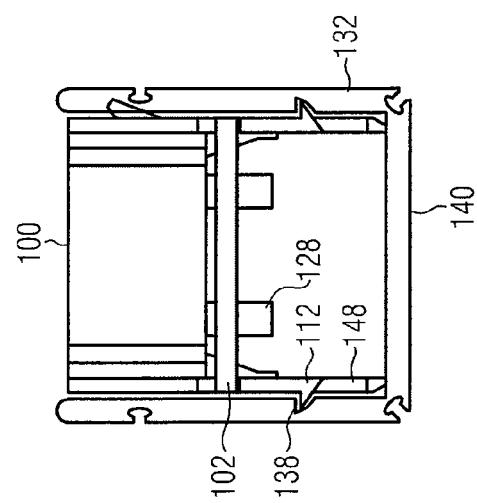
FIG. 14 shows a schematic cross section of the optical module according to FIG. 13.
Figure 17:
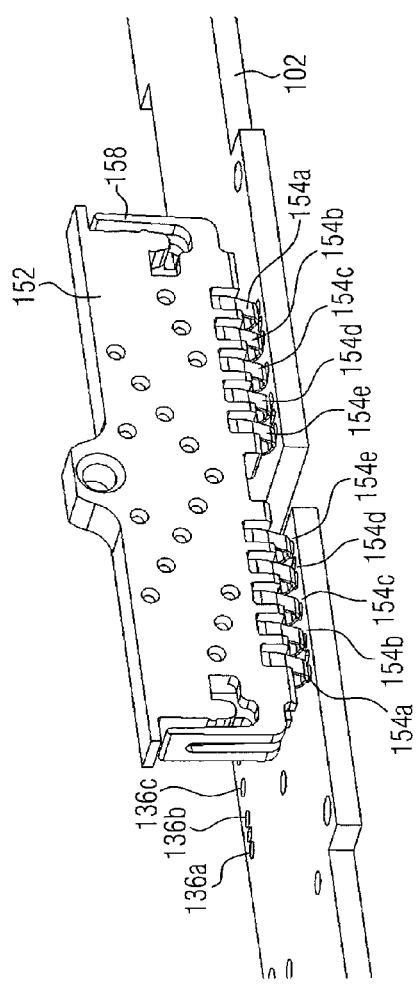
FIG. 17 shows an interconnection element according to another embodiment.
Figure 18:
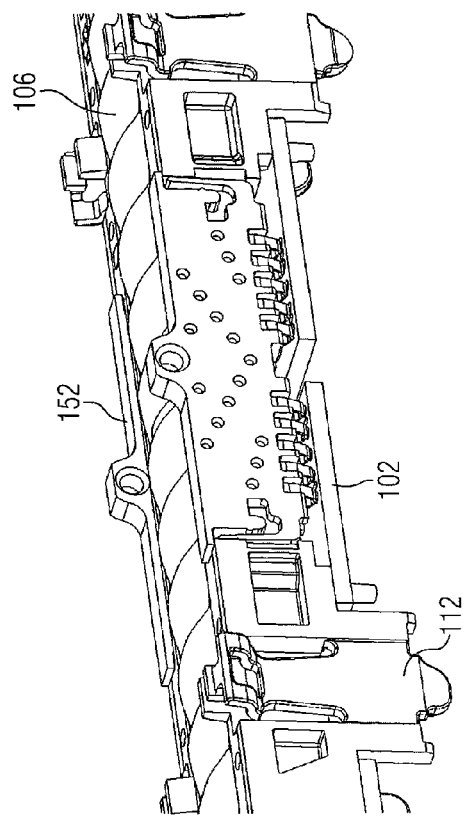
FIG. 18 shows the connection between two optical modules by means of two interconnection elements according to FIG. 17.
Figure 19:
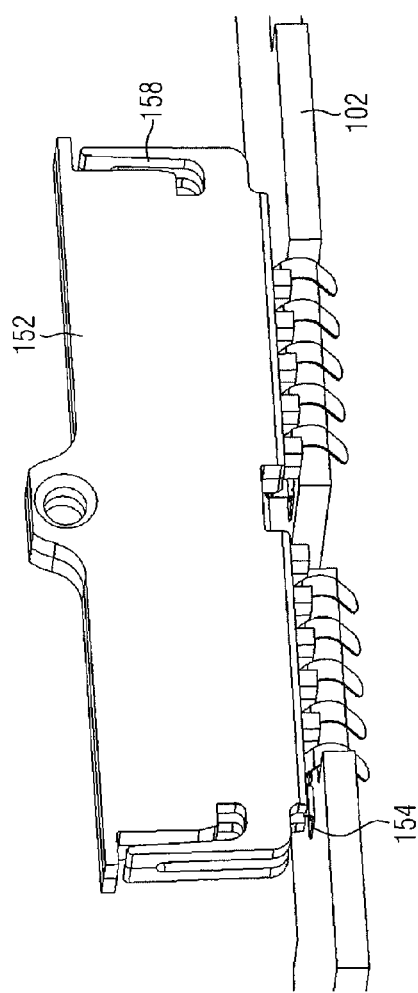
FIG. 19 shows an interconnection element according to a further embodiment.
Figure 20:
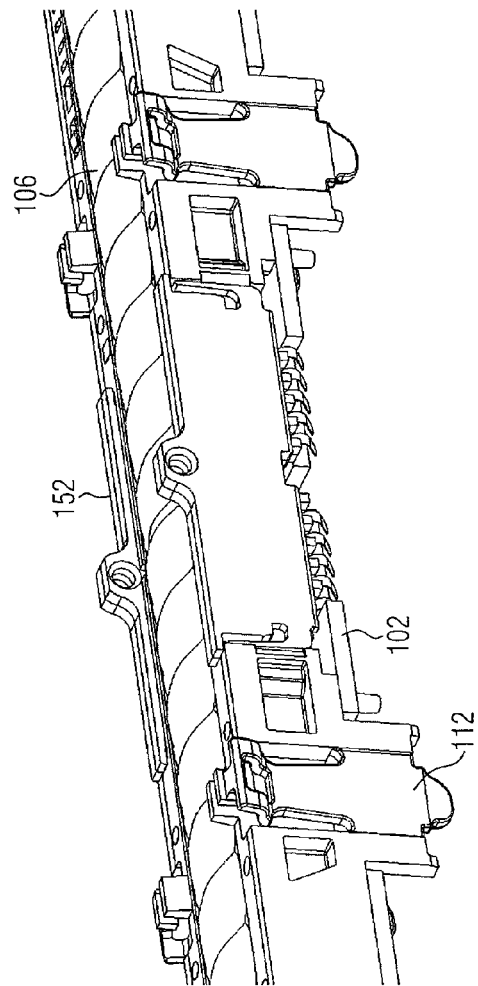
FIG. 20 shows the connection between two optical modules by means of two interconnection elements according to FIG. 19.

In all the FIGS. 1 to 12, the alignment means 112 were always formed by more or less incompressible, straight protrusions which were pressed downward onto the inner plane of the basis by the spring force. However, as shown in FIGS. 13 and 14, the alignment means 112 may also be formed to have resiliency and to rest against a defined plane 138 arranged at the side walls of the profile 132. Spring arms 148 rest against the basis of the profile and exert a pressure which is directed away from the basis and along the direction of the optical axis, pressing the alignment means 112 upwardly against the defined inner surface 138. Thus, a more secure fixing of the optical module 100 in the support element 132 can be achieved.

An optical unit 150 according to the present invention can also contain more than one optical module 100 and/or a control module (not shown in the figures). The individual optical modules 100 are mounted within the support element 132 in a direction along the optical axis preferably in a serial manner. For providing an electrical connection between one optical module and the next, one or more interconnection elements 152 can be provided. Furthermore, the interconnection elements 152 also preferably mechanically fix the optical modules 100 in respect to each other. Hence, the distance between the last lens of the first module and the first lens of the next module can be defined very accurately, thereby ensuring that the resolution stays correct from module to module. Moreover, a different temperature expansion can be absorbed by the interconnection elements, which is an important aspect for longer light curtains where different distances between the individual optical modules can be avoided.

FIG. 15 shows a first embodiment of such an interconnection element. On each of the PCB's 102, contact terminals 136 are provided which are connected to corresponding terminals by means of the interconnection element 152. As symbolized by the reference numerals, always two contact terminals 136a to 136e are preferably directly connected to each other by one electric lead provided within the interconnection element 152. Corresponding contact elements 154 are provided at the interconnection element 152.

According to the arrangement of FIGS. 15 and 16, the contact elements 154 are formed by metallic leaf springs which are compressed in order to contact to the terminals on the PCB 102. As shown in FIG. 16, two contact elements can be employed for connecting two optical modules 100 in series. When mounting the optical modules in the support element 132, same are first inserted in a direction 156 along the optical axis and are retained within the support element 132 by means of one of the fixing means explained above. In a next step, the interconnection elements 152 are inserted in the same direction and are also retained by means of resilient fixing means 158.

There are, of course, a plurality of mechanical possibilities how the electric contact may be established between the contact elements 154 and the terminals 136. Apart from abutting contacts, as shown in FIGS. 15 to 20, press-fit connections can also be provided, as shown in FIGS. 21 and 22.

Figure 23:
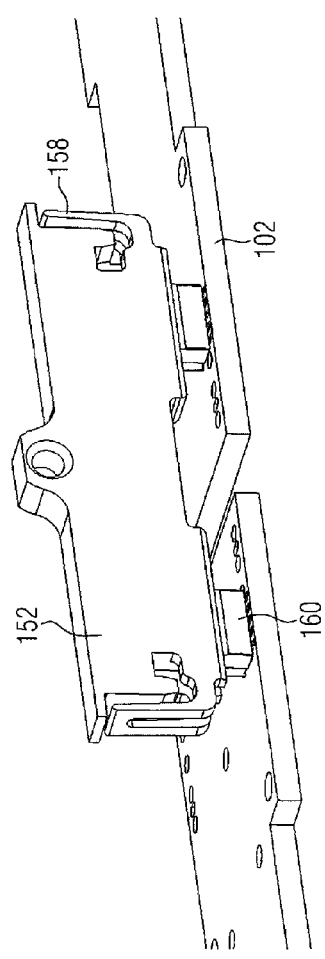
FIG. 23 shows an interconnection element according to a further embodiment.
Figure 24:
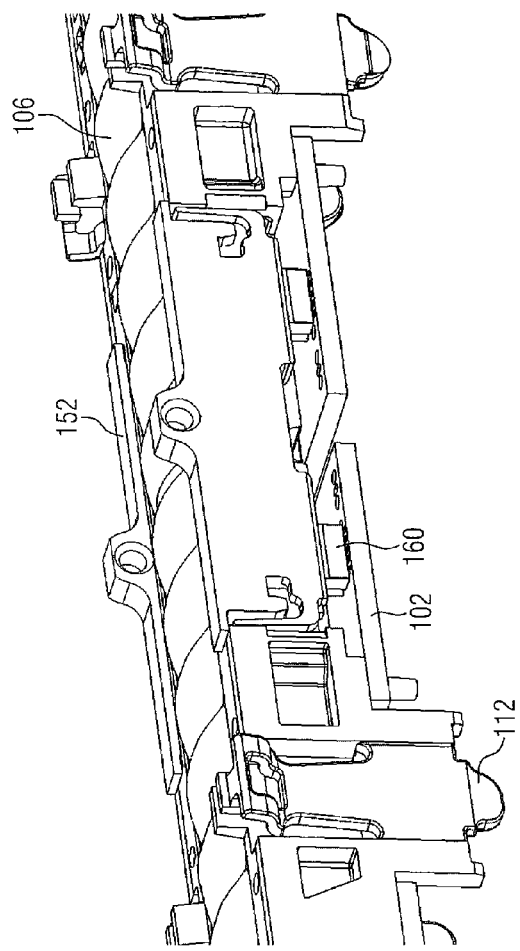
FIG. 24 shows the connection between two optical modules by means of two interconnection elements according to FIG. 23.
Figures 25, 26:
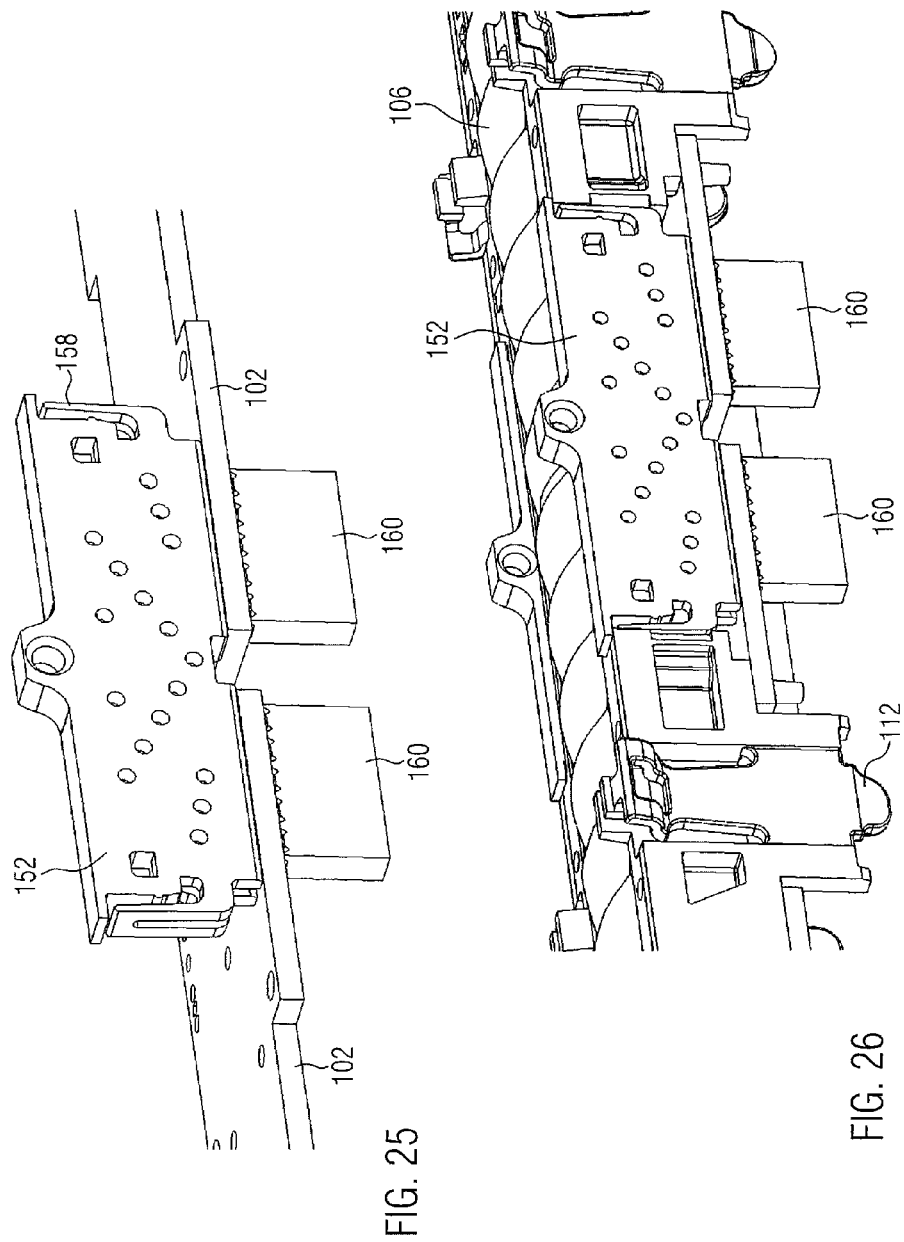
FIG. 25 shows an interconnection element according to a further embodiment.
FIG. 26 shows the connection between two optical modules by means of two interconnection elements according to FIG. 25.
Figure 27:
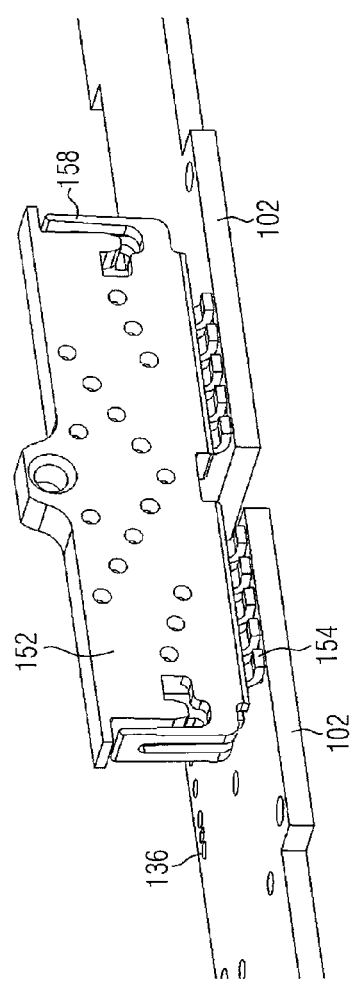
FIG. 27 shows an interconnection element according to a further embodiment.
Figure 28:
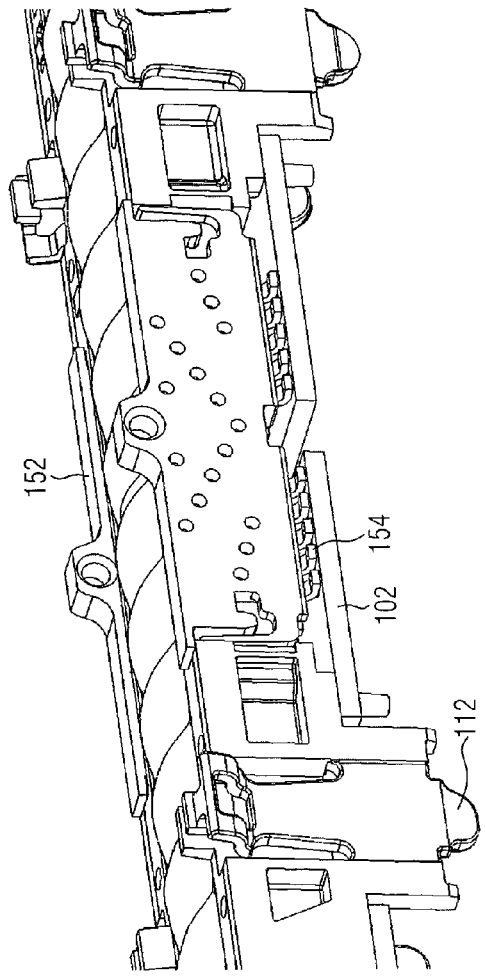
FIG. 28 shows the connection between two optical modules by means of two interconnection elements according to FIG. 27.

Furthermore, the printed circuit board 102 may be equipped with a plug connector 160. FIGS. 23 and 24 show a construction where a plug connector 160 is provided on the same side of the PCB 102 which is also in contact with the module body 108. Alternatively, the connector housing 160 may also be attached to the opposite surface of the PCB 102. Plug connectors 160 as shown in FIGS. 23 to 26 may be soldered to the printed circuit board. FIGS. 27 and 28, finally, show still another abutting contact using U-shaped springs for electrically contacting the contact terminals 136 of the PCB 102.

In summary, the present invention provides an improved optical module and an optical unit for a light curtain by combining or alternatively using the following improvements:

The optical modules are mounted within a support element in a way that they have their reference for the mounting position on the bottom of the aluminium profile. It can be shown that this is the particular surface of the profile which is most exact with respect to the outside bottom surface of the profile which is used for mounting light curtains on a machine or the like. Hence, a minimal mounting tolerance can be achieved. Furthermore, due to the fact that the optical modules are mounted in a direction along the optical axis, no sliding or shifting is necessary, and each module can be mounted at its correct position directly. Resilient fixing means allow for assembly or disassembly in a particularly efficient and secure way.

In order to align the optical axis of all the modules in one direction, each module is aligned with the best possible precision in the profile. According to the present invention, the bottom surface of the profile acts as a reference for the module, when mounting same for the profile. By means of the special fixing means, the optical module is held in position so that it cannot move from the bottom after being mounted.

The present invention allows for a very short tolerance chain in the profile, from the machine to which the profile is mounted to the module which defines the optical axis, just defined by the basis of the profile. The position of the module in the profile is independent of the shape and position of any sidewalls of the profile. In case of insufficient tolerances of the profile bottom surface, the surface can be milled or cut after the extrusion step for tolerance improvement, a step which is easily to be performed.

In particular, according to the present invention, springs or other resilient fixing means push down the module to the reference position. These springs exert the required force to the profile. Different metal sheets which are provided in the lens carrier or the module body can be used to form the spring.

A best fitting shape can easily be realized an overmolding step for overmolding the metal core with the same plastic as the module body or the lens.

Many different implementations of such springs are possible. They can be provided at the top of the module, at the bottom of the module, at any sidewalls of the module, or at any combination of the locations. The advantage of this solution can be seen in the fact that the springs constitute a part of the module and no extra parts are needed. In particular, when using a metal core within the plastic part, the required force can be achieved much more easily than only with a mere plastic spring. Alternatively or additionally, also glass fiber reinforcement can be added to the plastic material for improving the resiliency.

In contrast to conventional arrangements where the complete optical modules are inserted from one end of the profile and slid longitudinally until they reach their required position, the present invention proposes a top-mounting technique, where each module is inserted in the direction of the optical axis, directly at its final correct position. No longitudinal shift of the modules in respect to the profile is required.

Consequently, no abrasion which would affect those parts that would define the exact alignment of the optical module, occurs. As no wearing down is caused, also no deterioration of the tolerances can occur. As the modules are fixed more firmly within the profile, also when subject to vibrations, no movement and no abrasion is caused during the operational lifetime. The optimal fixing of the modules within the profile furthermore ensures an optimal optical resolution between the modules, because no variable gap occurs, if several modules are aligned in series.

The electric interconnection according to the present invention is performed by means of overmolded contacts which connect the two modules electrically. The shape of the molded part interconnects the modules mechanically, and the soldering points of the interconnection are not stressed mechanically. The interconnection elements are also mounted from the top as the modules are connected.

Because also for connecting the modules to each other, no longitudinal movement is necessary, the top mounting is easily performed. As none of the electrically contacts are mechanically stressed, same are reliable and secure. Different options for the electrical contact mechanism are proposed. For instance, spring contacts to gold pads or contact pins which are inserted into a contact jack, can be used.

Due to the tight tolerances and the mounting principles of the present invention, an easy to align light curtain with a large optical angle (EAA) of each beam can be achieved. All over the light curtain, extremely low tolerances from one beam to another can be achieved. This is a result of the tight tolerances in the placement of the light receiving and/or emitting elements using, for instance, a chip onboard (COB) technique, by ensuring a similar thermal expansion between the PCB and the module body and between the PCB, the module body and the lenses. The tolerances between the optical stops and the lenses are tight and are tool bound during the overmolding step. For the receiving elements, photodiodes with a large sensitive area can be used so that the positioning of the photodiode will not be critical. In summary, during production, no adjustments of the light curtain parts are required and the light curtain will be easy to align when being mounted in the particular application.

The lenses are fabricated with an integrated lens mask by placing a metal sheet which serves as the lens mask into the molding tool in a first step and by overmolding this metal sheet with the lens material, e.g. PC or PMMA. Hence, one single part is produced instead of a lens and a separate lens mask, thus facilitating the mounting process. A very high precision can be reached for the lens mask placement. When using such an assembly for safety light curtains, a very exact resolution can be achieve because the lens mask has extremely low tolerances in respect to the lens. Furthermore, the thermal expansion is defined by the metal sheet instead of the plastic characteristics and therefore is much less critical than for pure plastics. Moreover, Fresnel lenses can be used instead of standard biconvex or plano-convex lenses.

A module body according to the present invention is also reinforced with an integrated metal sheet. Firstly, the metal sheet is stamped to the required shape and secondly, the metal sheet is bent as required and placed into a molding tool. In a third step the metal sheet is overmolded with the module body material, e.g. PBT. In an advantageous way, the mechanical stability and robustness of the module body is enhanced by the metal sheet. No glass fibers are needed in the plastic for improvement of stability, which could impair the mechanic tolerances. Furthermore, dispensing with glass fibers in the plastic material also extends the lifetime of the molding tool. The thermal expansion coefficient of a modul body having an integrated metal sheet is very similar to the coefficient of a PCB, resulting in a very accurate positioning of the optical components with respect to the module body.

Finally, the module body and the lens carrier can be fabricated as one integrated molded part. In a first step the lens with the lens mask are fabricated by a molding step. In a second step, in the same tool and without extracting the lens carrier, the module body is molded so that one single part is formed including the lens and the module body.

Hence, very low tolerances between the lenses and the module body can be achieved. The integrated metal sheets of the lens mask and the stabilization element equalize the thermal expansion of the two parts and approximate same to the thermal expansion coefficient of a PCB. This is particularly important when LED chips, which are not much bigger than the aperture in front of the LED, are placed on the PCB by means of a chip-on-board assembly technique.

Finally, it should be mentioned that the use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What we claim is:

1. An optical module for an optical unit of a light curtain monitoring a protective field, said optical module comprising:
    at least one of at least one radiation emitting element for transmitting at least one radiation beam forming said light curtain and at least one radiation receiving element for receiving at least one radiation beam forming the light curtain;
    a module body for mounting a radiation transmitter/receiver carrier carrying the at least one of the at least one radiation emitting element and the at least one radiation receiving element;
    wherein the module body has at least one alignment element for aligning the optical module within a support element forming an outer housing of said optical unit; and
    wherein said alignment element further comprises a protrusion which extends in a direction along an optical axis of the at least one radiation beam toward an inner surface of the support element, and which, for mounting the optical module within said support element, is in direct abutting contact with a portion of the inner surface of the support element that extends across the optical axis of the at least one radiation beam and does not extend beyond the inner surface of the support element.

2. The optical module according to claim 1, wherein the module body further comprises fixing means for fixing the optical module within said support element.

3. The optical module according to claim 2, wherein said fixing means further comprise at least one resilient snap-in element that co-operates with a corresponding snap-fit connector provided at the support element.

4. The optical module according to claim 1, wherein said optical module further comprises a lens carrier with at least one lens for focusing the at least one radiation beam.

5. The optical module according to claim 1, wherein said optical module further comprises an optical stop element with at least one cut-out for at least one of letting pass radiation emitted by said at least one radiation emitting element and received by said at least one radiation receiving element.

6. The optical module according to claim 1, further comprising, an optical shielding element for optically shielding a propagation path of the radiation beam between said module body and said lens carrier, wherein said optical shielding element is fabricated as a part separate from the module body and the lens carrier.

7. The optical module according to claim 1, wherein said at least one radiation emitting element is further defined as at least one of a light emitting diode and an LED and the at least one radiation receiving element is further defined as a photo diode.

8. The optical module according to claim 1, further comprising interconnection means for connecting the optical module to at least one of another optical module or a control module.

9. An optical unit that forms a light curtain for monitoring a protective field, said optical unit comprising:
    at least one optical module that includes at least one radiation emitting element for transmitting a radiation beam and at least one radiation receiving element for detecting a radiation beam associated with forming a light curtain;

a radiation transmitter/receiver carrier carrying the at least one radiation emitting element and radiation receiving element;

a support element forming an outer housing of the optical unit; and a module body for mounting the radiation transmitter/receiver carrier, the module body having at least one alignment element for aligning the at least one optical module within the support element, the alignment element further comprising a protrusion that extends in a direction along an optical axis of the at least one radiation beam toward an inner surface of the support element, and which, for mounting the optical module within said support element, abuts a portion of the inner surface of the support element that extends in a direction across the optical axis of the at least one radiation beam.

10. The optical unit according to claim 9, wherein said support element has an essentially U-shaped cross-section with a base and two legs, and wherein said at least one alignment element interacts with an inner surface of said base to align the at least one optical module with respect to an outer surface of said base.

11. The optical unit according to claim 9, further comprising at least one interconnection element for electrically connecting said at least one optical module to at least one of another optical module and a control module.

12. The optical unit according to claim 11, wherein said at least one interconnection element comprises electrical terminals that are formed as one of abutting spring contacts, plug-in contacts, or press-fit contacts.

13. The optical unit according to claim 11, wherein said at least one interconnection element is formed from an overmolded lead frame.

14. A method for assembling an optical unit of a light curtain monitoring a protective field, said method comprising:

providing at least one optical module and a support element which forms an outer housing of said optical unit, said optical module having:

at least one of at least one radiation emitting element for transmitting at least one radiation beam associated with forming said light curtain and at least one radiation receiving element for receiving at least one radiation beam;

a module body for mounting a radiation transmitter/receiver carrier carrying at least one of the at least one radiation emitting element and the at least one radiation receiving element; and wherein the module body has at least one alignment element for aligning the optical module within the support element that forms the outer housing of said optical unit;

inserting the at least one optical module into the support element in a direction along an optical axis of the at least one radiation beam; and providing the support element with a generally U-shaped cross-section defined by a base that extends between two legs in a direction that is generally transverse to the optical axis, and wherein, in the step of inserting the at least one optical module into the support element, said at least one alignment directly contacts an inner surface of said base of the support element to align the optical module with respect to an outer surface of said base.

15. The method of claim 14, further comprising snap-fitting the at least one optical module within the support element.

16. The method of claim 14, further comprising inserting at least one interconnection element for electrically connecting, said at least one optical module to at least one of another optical module and a control module, wherein the inserting is preformed in a direction along an insertion direction associated with at least one optical module.

17. The method of claim 14, further comprising providing a lens carrier associated with said optical module and the lens carrier includes at least one lens for focusing the at least one radiation beam, and wherein said module body and said lens carrier are fabricated as one integral molded part.

* * * * *